United States Patent
Vaidya et al.

(12)

(10) Patent No.: US 6,445,787 B1
(45) Date of Patent: Sep. 3, 2002

(54) MULTI-DROP DIGITAL TELEPHONE LOOP

(75) Inventors: Avinash K. Vaidya, Riverwoods; Jay Biondo, Bloomingdale; Song Kue, Schaumburg, all of IL (US)

(73) Assignee: Charles Industries, Ltd., Rolling Meadows, IL (US)

( * ) Notice: Subject to any disclaimer, the term of this patent is extended or adjusted under 35 U.S.C. 154(b) by 0 days.

(21) Appl. No.: 09/243,010

(22) Filed: Feb. 2, 1999

(51) Int. Cl.7 .......................... H04M 3/00; H04B 7/005
(52) U.S. Cl. ...................... 379/243; 379/229; 370/278; 370/431
(58) Field of Search ................... 379/243, 242, 379/229, 230, 219, 207.04, 413.02, 93.01, 93.05–93.07; 370/431, 432, 437, 438, 439, 464–466, 278

(56) References Cited

U.S. PATENT DOCUMENTS

| | | | | |
|---|---|---|---|---|
| 3,876,838 A | * | 4/1975 | Boxall ........................ 370/434 |
| 4,001,514 A | * | 1/1977 | Wurst ........................ 370/434 |
| 4,625,308 A | * | 11/1986 | Kim et al. .................. 370/321 |
| 5,189,673 A | * | 2/1993 | Burton et al. ............... 370/490 |
| 5,956,343 A | * | 9/1999 | Cornes et al. .............. 370/437 |
| 6,049,550 A | * | 4/2000 | Baydar et al. .............. 370/466 |
| 6,222,849 B1 | * | 4/2001 | Cornes et al. .............. 370/437 |
| 6,259,746 B1 | * | 7/2001 | Levin et al. ................ 375/295 |

OTHER PUBLICATIONS

Brochure of Charles, a Charles Industries, Ltd., on "Alchemy™ 2000 QuadPOTS Digital Multi–Line System"; (1997).

* cited by examiner

Primary Examiner—Armad F. Matar
Assistant Examiner—Benny Q. Tieu
(74) Attorney, Agent, or Firm—Leydig, Voit & Mayer, Ltd.

(57) ABSTRACT

A multi-drop digital telephone loop uses point-to-point digital communication between a series of Add/drop units and a central office terminal to route telephone traffic to customers. The loop automatically detects and signals subscriber channel conflicts and also function in an auto-assign mode for automatically assigning subscriber channels. The loop may also be deployed in conjunction with a remote terminal located at a subscriber's residence or business.

19 Claims, 15 Drawing Sheets

FIG. 9

| Bit # | Description |
|---|---|
| 15 (MSB) | Set High |
| 14 | Set High for Alternate Status |
| 13 | Set High if A/D End Unit |
| 12 | Set High for Alive |
| 11 | Set High for Subscriber Channel 12 |
| 10 | Set High for Subscriber Channel 11 |
| 9 | Set High for Subscriber Channel 10 |
| 8 | Set High for Subscriber Channel 9 |
| 7 | Set High for Subscriber Channel 8 |
| 6 | Set High for Subscriber Channel 7 |
| 5 | Set High for Subscriber Channel 6 |
| 4 | Set High for Subscriber Channel 5 |
| 3 | Set High for Subscriber Channel 4 |
| 2 | Set High for Subscriber Channel 3 |
| 1 | Set High for Subscriber Channel 2 |
| 0 (LSB) | Set High for Subscriber Channel 1 |

| Switch Setting | BCD Value msb  lsb | Description |
|---|---|---|
| 0 | 0 0 0 0 | Default |
| 1 | 0 0 0 1 | Request Subscriber Channel 1 |
| 2 | 0 0 1 0 | Request Subscriber Channel 2 |
| 3 | 0 0 1 1 | Request Subscriber Channel 3 |
| 4 | 0 1 0 0 | Request Subscriber Channel 4 |
| 5 | 0 1 0 1 | Request Subscriber Channel 5 |
| 6 | 0 1 1 0 | Request Subscriber Channel 6 |
| 7 | 0 1 1 1 | Request Subscriber Channel 7 |
| 8 | 1 0 0 0 | Request Subscriber Channel 8 |
| 9 | 1 0 0 1 | Request Subscriber Channel 9 |
| A | 1 0 1 0 | Request Subscriber Channel 10 |
| B | 1 0 1 1 | Request Subscriber Channel 11 |
| C | 1 1 0 0 | Request Subscriber Channel 12 |
| D | 1 1 0 1 | No POTS Line to drop |
| E | 1 1 1 0 | No POTS Line to drop |
| F | 1 1 1 1 | POTS Assignment under COT Control |

| Conflict Value | Description |
|---|---|
| F | No Conflict |
| E-C | Unused |
| B | Ch. #12 in conflict |
| A | Ch. #11 in conflict |
| 9 | Ch. #10 in conflict |
| 8 | Ch. #9 in conflict |
| 7 | Ch. #8 in conflict |
| 6 | Ch. #7 in conflict |
| 5 | Ch. #6 in conflict |
| 4 | Ch. #5 in conflict |
| 3 | Ch. #4 in conflict |
| 2 | Ch. #3 in conflict |
| 1 | Ch. #2 in conflict |
| 0 | Ch. #1 in conflict |

1100

MULTI-DROP DIGITAL TELEPHONE LOOP

TECHNICAL FIELD

The invention relates generally to multidrop telephone systems, and more particularly to multidrop digital loop telephone systems.

BACKGROUND OF THE INVENTION

For over 20 years, Frequency Division Multiplexed (FDM) multidrop systems, such as the 82A, 84A, 85A, and CM-8 Station Carrier Systems have been used to deliver telephone service to remote areas. In these systems, analog signals are transmitted from a telephone company central office to a series of Remote Terminals (RTs) mounted on telephone poles. Telephone lines are then "dropped" from each RT to residences and businesses for use by customers. As with all analog systems, FDM multidrop systems are limited in their ability to handle the high data transfer rates required for such applications as high speed internet access or high speed fax transmission. Even when customers have an extra line dedicated for internet access or a fax machine, they often cannot use the extra line for its intended purpose due to interference problems associated with these analog systems. Modem digital phone systems solve the problems associated with transmitting data at high speeds over phone lines. However installation and configuration of these systems is often cumbersome. When a telephone technician installs a digital subscriber line (DSL) in an area, or adds a new phone connection in a location already having a DSL, he is often required to physically travel back and forth from the Remote Terminal (RT) to the central office, and also from RT to RT to verify that the system is working correctly. This can be extremely time consuming, especially in rural areas where the distance between RTs and the central office can be considerable. Furthermore, assigning phone numbers to the various RTs must be done manually at each RT Unit, which is also a time consuming process. If there are any mistakes in assigning the numbers, the technician must resolve them manually at the RT unit.

SUMMARY OF THE INVENTION

The present invention solves this problem using a multi-drop digital loop (MDDL) having a central office terminal and a series of remote terminals called "Add/Drop Units" that communicate status and conflict information to one another over a telephone line using a full duplex 2B1Q encoding scheme. Each Add/Drop unit has a dedicated control channel through which it can send status messages to the central office terminal. The central office terminal can also use the control channel to send commands to each Add/Drop unit.

When in automatic assignment mode, the central office terminal transmits subscriber channels to each of the Add/Drop units. Each subscriber channel carries telephone communication to and from one of the phones on the loop.

In an alternative embodiment, the invention may be implemented as a central office terminal connected to an Add/Drop Unit, wherein the Add/Drop Unit drops a single digital subscriber line to a subscriber's residence or business, and the single digital subscriber line feeds into a remote terminal. The remote terminal can then drop one or more telephone lines to the subscriber.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 9 is a table of the bit assignments for a status message in the preferred embodiment of the invention;

FIG. 10 is a table of the selector switch settings in the preferred embodiment of the invention;

FIG. 11 is a table of the bit assignments for the most significant four bits of a broadcast message in the preferred embodiment of the invention;

DETAILED DESCRIPTION OF THE INVENTION

Figure 1:
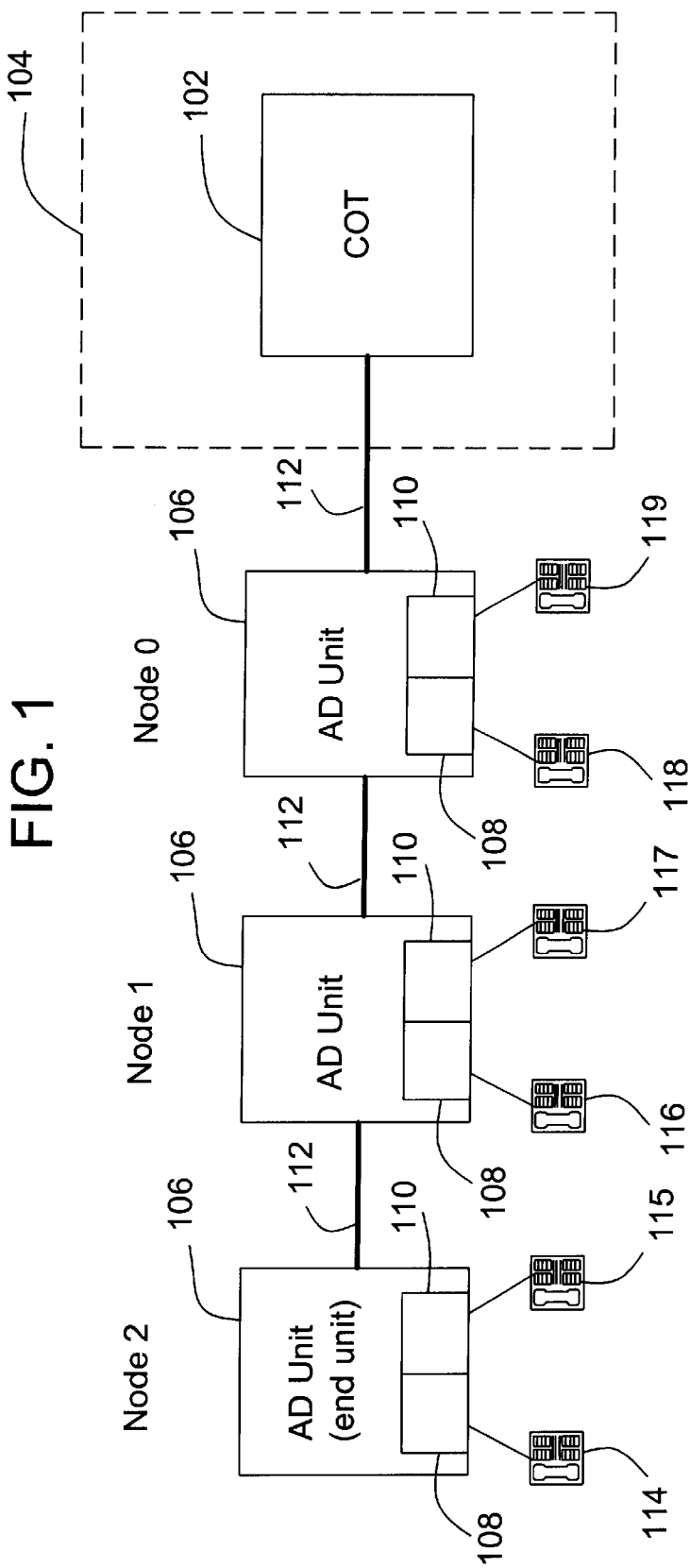
FIG. 1 is a diagram of the overall layout of the preferred embodiment of the invention.

Turning to the drawings, wherein like reference numerals refer to like or similar elements, an exemplary multi-drop digital loop (MDDL) 100 is shown in FIG. 1. The MDDL includes a Central Office Terminal (COT) 102 located in a central office 104. The COT 102 communicates with at least one Add/Drop (AD) Units 106 over a line 112. In the preferred embodiment, the line 112 is a High bit rate Digital Subscriber Line (HDSL) twisted pair that links each of the AD Units 106 in series with one another, although persons skilled in the art will recognize that other communications media are possible. Although only three AD units are depicted, the preferred embodiment of the MDDL 100 can accommodate up to twelve AD units 106. The invention, however, is not limited to any specific number of AD Units 106. Power to the AD Units is supplied from the COT 102 over the line 112. The AD Unit 106 located at the final node in the series functions as an "End Unit," as will be discussed below.

In the preferred embodiment shown in FIG. 1, each AD Unit 106 is associated with a node along the line 112. Line 112, in the preferred embodiment, is not a single line. Instead, it is a set of lines connected by the AD Units 106 which also function as repeaters. Other line topologies will be known to those skilled in the art. The COT 102 identifies each node with a "Node ID," and uses this number to refer to each respective AD unit 106. The numbering of the nodes is consecutive starting with the first node in the series. In the MDDL 100 shown in FIG. 1, the AD Units 106 are associated with Nodes 0–2 respectively. During initialization procedures, the MDDL 100 assigns node IDs to the AD Units 106, as will be described later in detail.

The COT 102 routes telephone communication from the central office 104 to the respective AD Units 106. The AD Units then send the communication through their drop side connectors 108 and 110 to a series of Plain Old Telephones (POTs) 114–119. The POTs 114–119 may also be fax machines, modems, or other devices capable of being connected to a phone line. While not intended to be a limitation to the present invention, each AD Unit 106 preferably accommodates up to two POTs (one per drop side connector). Each POT is assigned a subscriber channel, which, in the preferred embodiment is a standard DSO 64 kilobit per second (kbps) channel. The COT 102 identifies each subscriber channel with a subscriber channel number, and, in the preferred embodiment, accommodates up to twelve subscriber channels (numbered from 1 to 12), although any number of subscriber channels may be used. Any POT in the MDDL may be assigned to any subscriber channel, but no two POTs should use the same subscriber channel.

Figure 2:
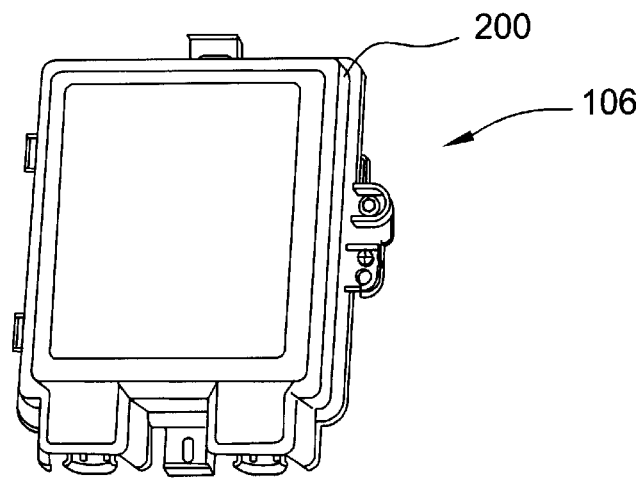
FIG. 2 is a perspective view of the preferred embodiment of an Add/Drop Unit casing in accordance with the invention.
Figure 3:
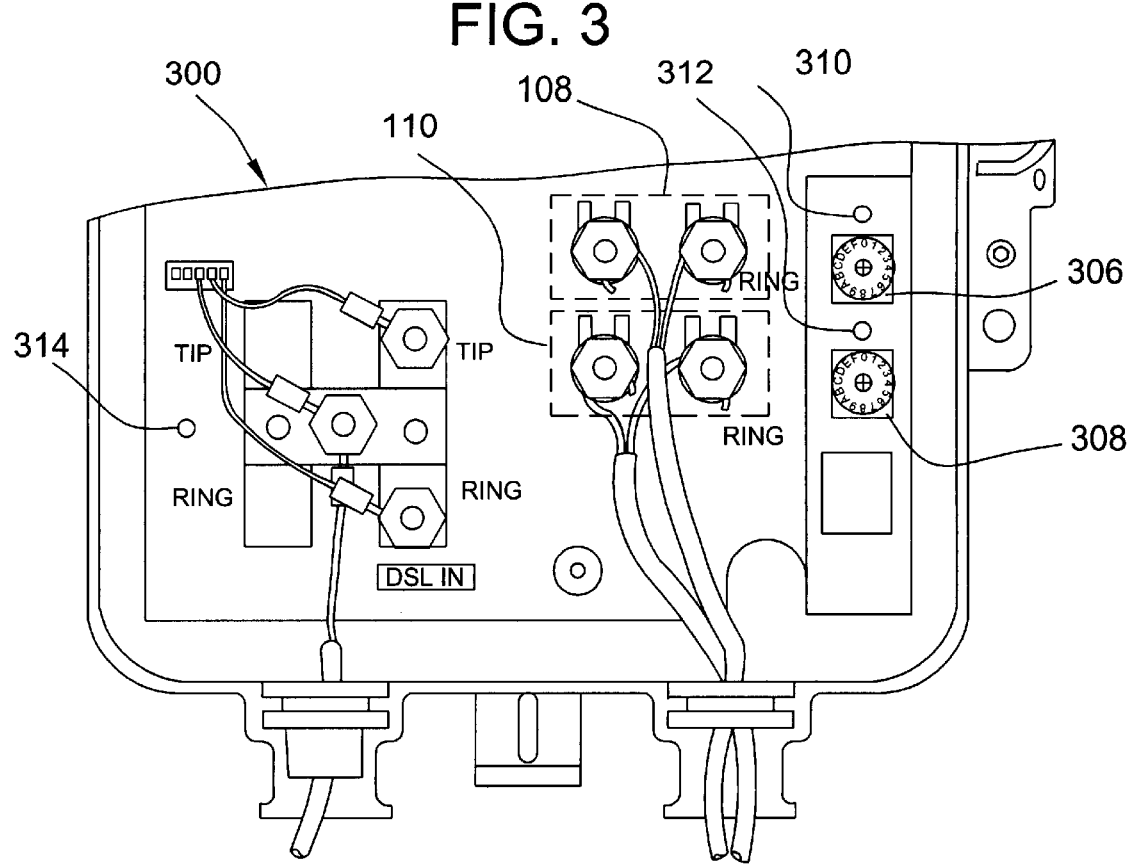
FIG. 3 is a partial front view of the preferred embodiment of an Add/Drop Unit panel in accordance with the invention.

Referring to FIG. 2, the AD Unit 106 is attached to a telephone pole or ground unit with a casing 200 in the preferred embodiment of the invention. Inside the casing, an AD Unit front panel 300 as illustrated in FIG. 3 allows access to the AD Unit 106 so that the AD Unit 106 may be configured to the needs of the subscriber. As illustratively depicted in FIG. 3, there are two sets of terminals corresponding to the two drop side connectors 108 and 110. Each drop side connector can supply or "drop " one POT line to a subscriber. The lines connected to drop side connectors 108 and 110 are referred to as "line 1" and "line 2" respectively. The AD Unit front panel 300 also has a selector switch 306 and conflict LED 310 for line 1; a selector switch 308 and conflict LED 312 for line 2; and a sync LED 314, all of whose functions will be described in detail below.

Figure 4:
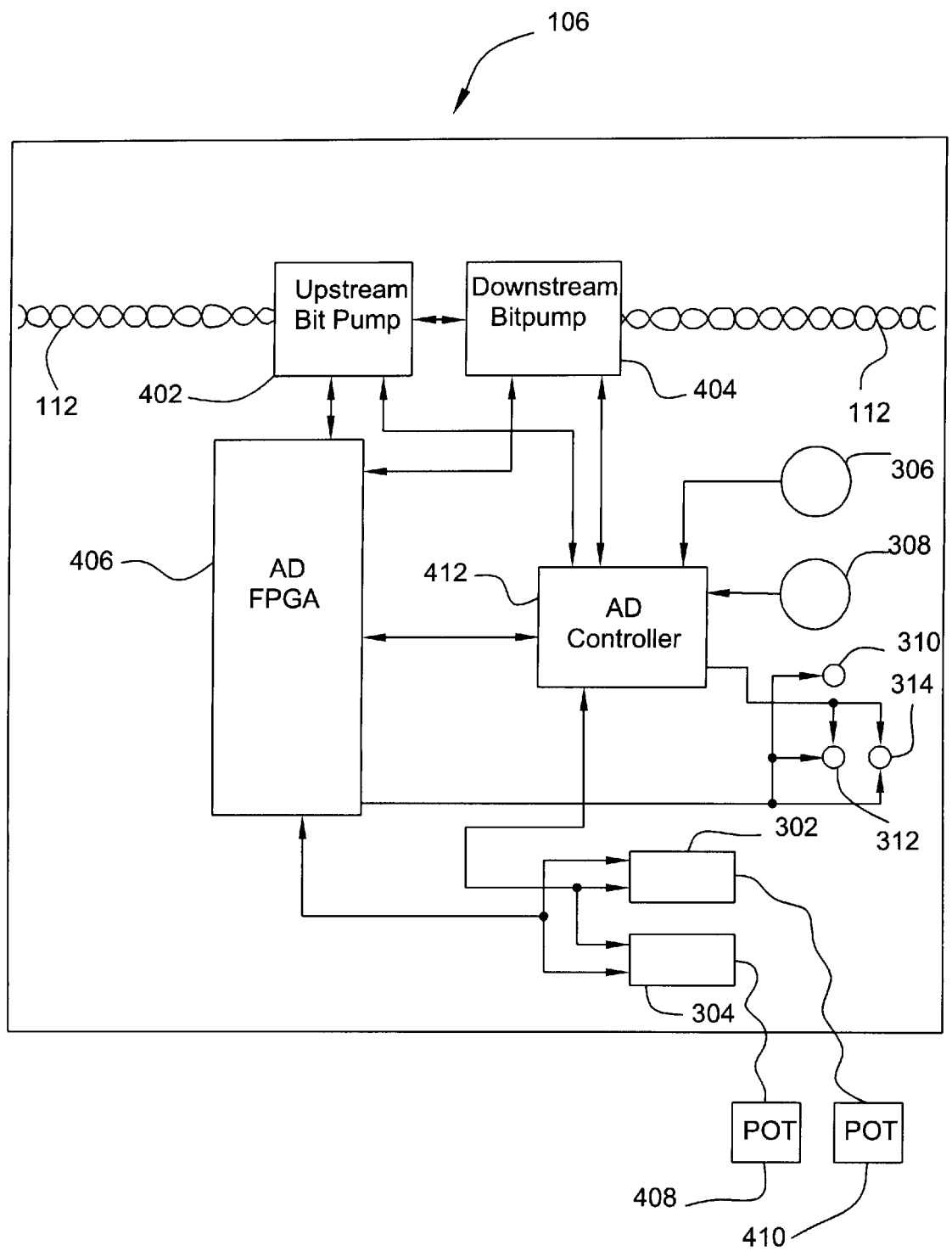
FIG. 4 is a block diagram of the internal architecture of the preferred embodiment of an Add/Drop Unit in accordance with the invention.

The internal architecture of the preferred embodiment of the AD Unit 106 is shown in FIG. 4. The AD Unit 106 interfaces with the line 112 using an upstream bit pump 402 and a downstream bit pump 404. Each bit pump is a variable rate transceiver that conventionally converts the analog signals from the line 112 into digital signals and vice versa using echo-cancel-with-hybrid and 2B1Q line encoding technology which are well known to those skilled in the art. In the preferred embodiment, the bit pumps 402 and 404 each include a Digital Signal Processor (DSP), and an analog front end integrated circuit (IC). An SK70720 or SK70725 (Viper) DSP and fully integrated CMOS analog front end IC are known to work, but other types may be used.

The Add/Drop Field Programmable Gate Array (AD FPGA) 406 extracts the appropriate payload signals from the incoming data stream and sends them to each of the subscriber channels 302 and 304 and eventually to POTs 408 and 410. In the preferred embodiment, the AD FPGA 406 may be a Xilinx XC4013E or Spartan equivalent, although other FPGAs may be used.

AD Controller 412 is a microprocessor that executes all of the program routines required for operating the AD Unit 106, including subscriber channel conflict resolution, processing automatic subscriber channel assignments, and communicating subscriber channel requests to the COT 102, receiving inputs from the selector switches 306 and 308, lighting the conflict LEDs 310 and 312, and lighting the sync LED 314, all of which will be described later in detail. In the preferred embodiment, the AD Controller 412 is a microprocessor, such as an 89C55 microprocessor having 20 kilobytes (20K) of on-board Flash memory, 256K of on-board Random Access Memory (RAM) and a Universal Asynchronous Receiver Transmitter (UART). Other types of microprocessors may be used, however.

Figure 5:
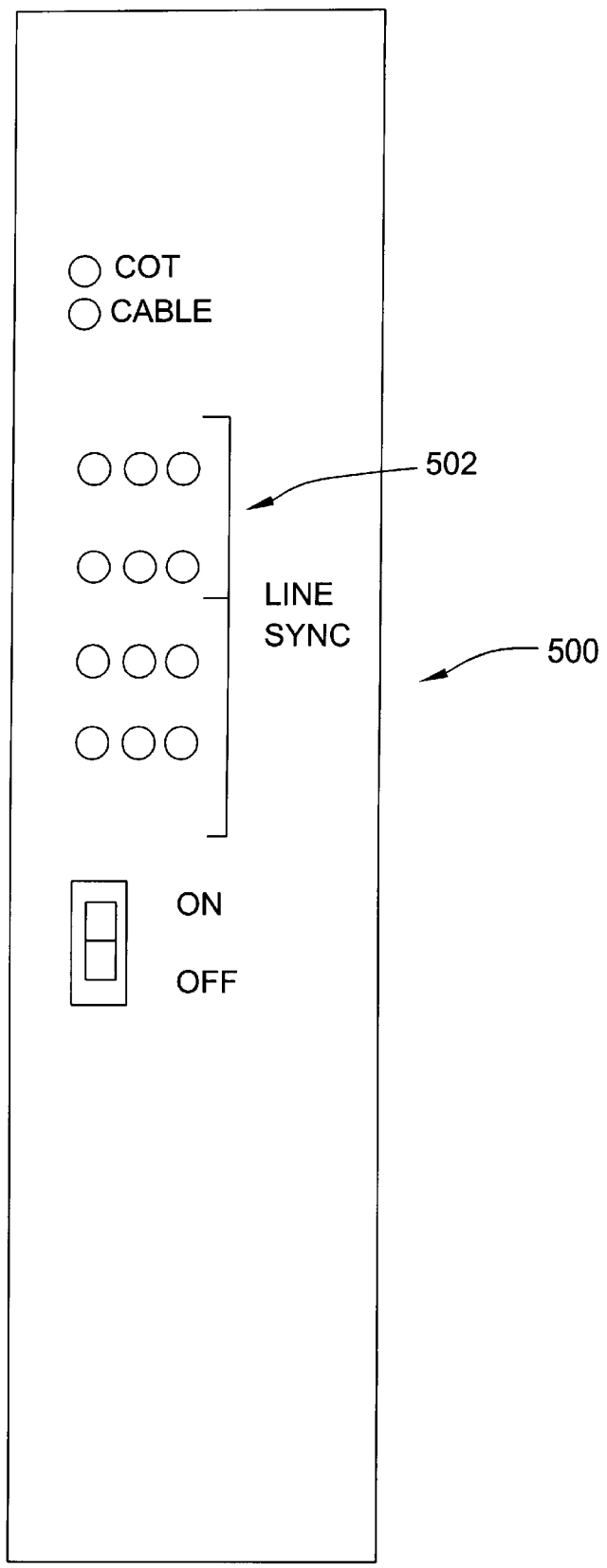
FIG. 5 is a front view of the preferred embodiment of a central office terminal panel in accordance with the invention.

The COT 102 has a front panel 500 as shown in FIG. 5 that allows a craftsperson to determine the status of the MDDL 100 from the central office 104. In the preferred embodiment, the front panel 500 has twelve line sync LEDs 502 that give the status of up to twelve AD Units (at twelve nodes along the line 112). It is contemplated, however, that any number of sync lights 314, representing any number of AD Units 106 may be used. If a node doesn't exist (i.e. an AD Unit 106 has not been installed), then the corresponding line sync LED stays unlit. When the AD Units 106 are synchronized and communicating with the COT 102, and there are no error conditions, the LEDs of the active nodes are a continuously lit—a steady green, for example. If there are any error conditions, such as a subscriber channel conflict (described below) or a loss of communication with any AD Unit 106, then the line sync LEDs 502 corresponding to the node IDs of the affected AD Units will flash. Furthermore, if the COT 102 loses communication with an AD Unit 106 that is an End Unit, then all active AD Unit sync LEDs 314 will flash green. In this manner, a craftsperson can determine whether there has been any break in the line 112.

Figure 6:
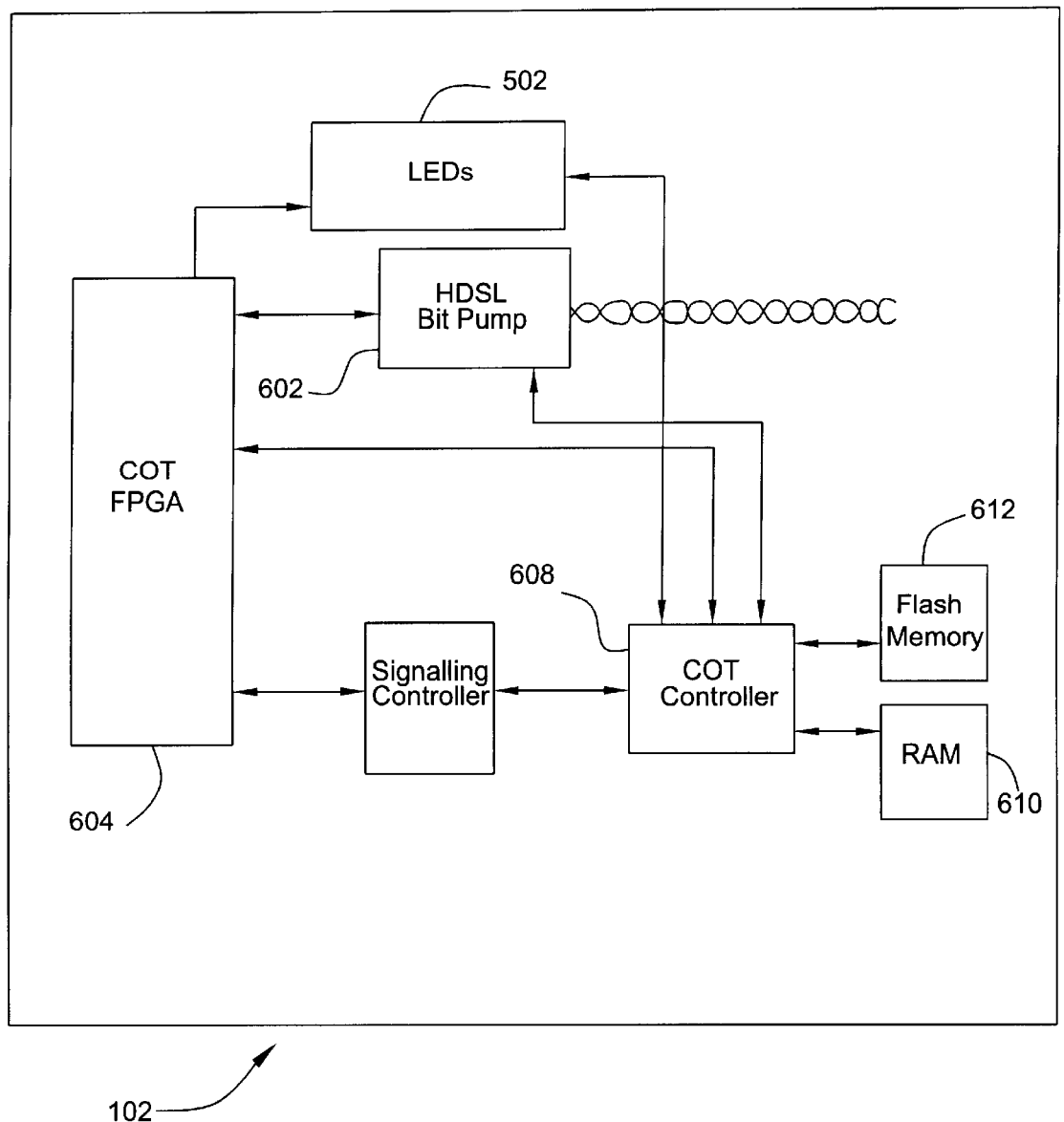
FIG. 6 is a block diagram of the internal architecture of the preferred embodiment of the central office terminal in accordance with the invention.

FIG. 6 shows the internal architecture of the preferred embodiment of the COT 102. The HDSL Bit Pump 602 converts analog signals to digital signals and vice versa in a conventional manner, and has a chip set similar to that of the bit pumps 402 and 404 in the AD Unit 106. The Central Office Terminal Field Programmable Gate Array (COT FPGA) 602 extracts the appropriate signals from the incoming data stream and provides them to the various components of the COT 102. The signaling controller 606 generates the signals for "on hook," "off hook," and "ringing" used for communicating with the POTs, while the COT controller 608 executes all of the program instructions necessary for the overall internal operation of the COT 102, including activation of the line sync LEDs 502. In a preferred embodiment, the signaling controller 606 may be a microprocessor, such as an Atmel AT89C55 microprocessor; the COT controller 608 may be microprocessor, such as a Motorola 68306 microprocessor; RAM 610 may be two Toshiba TC551001BFTI-85L (or equivalent) 128K×8 static RAM chips; and the flash memory 612 is an AMD 29F400AB (or equivalent) with 256K×16 program space.

In the preferred embodiment, COT 102 and the AD Units 106 communicate at 800.68 kilobits per second (kbps) nominal using a full duplex 2B1Q digital encoding scheme. Each data frame contains 4512 bits reserved for "payload" to carry customer telephone calls to and from the POT lines, 96 bits for twelve Embedded Operations Channels or "EOC's" (one channel for each AD Unit 106), 4 bits for the node ID assignment, and 5 bits for a broadcast channel (4 bits for the conflict indicator, 1 bit for a node alarm indicator) that allows the COT 102 to signal all AD Units simultaneously.

Figure 7:
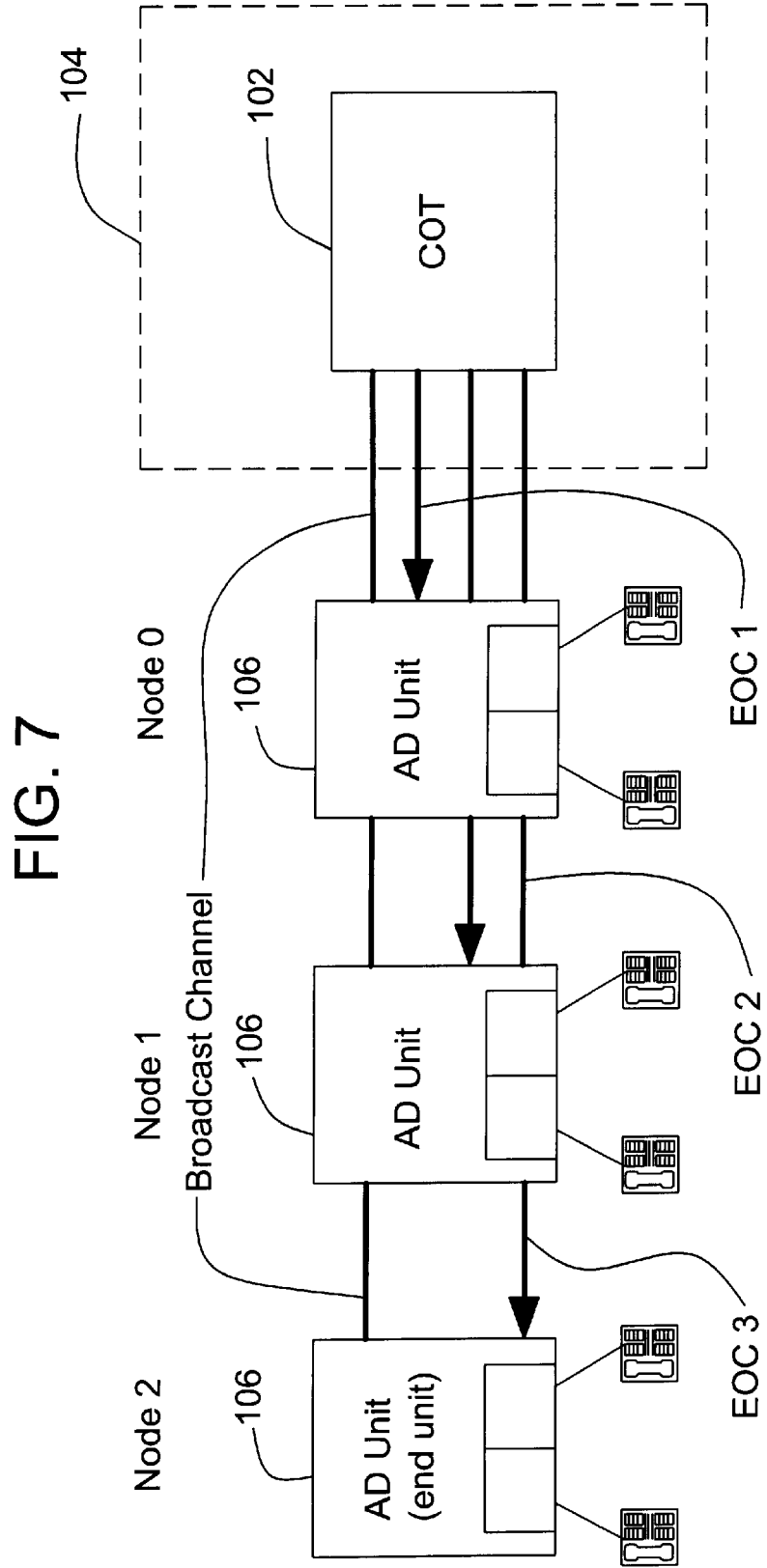
FIG. 7 is a block diagram showing a communication scheme in accordance with a preferred embodiment of the invention.

The twelve EOC's are reserved for point-to-point communication between the COT 102 and the respective AD Units 106 as shown in FIG. 7. In the preferred embodiment, each EOC accommodates a message of 16 bits sent over a period of two frames (eight bits per frame). Messages between the COT 102 and the AD Units 106 are time division multiplexed. Each AD Unit 106 has a dedicated slot determined by its node ID. When an AD Unit 106 receives a frame of data from the COT 102, the AD Unit extracts the data from the EOC corresponding to the AD Unit's node ID, and then relays the entire frame to the next AD Unit 106 in the series.

Figure 8:
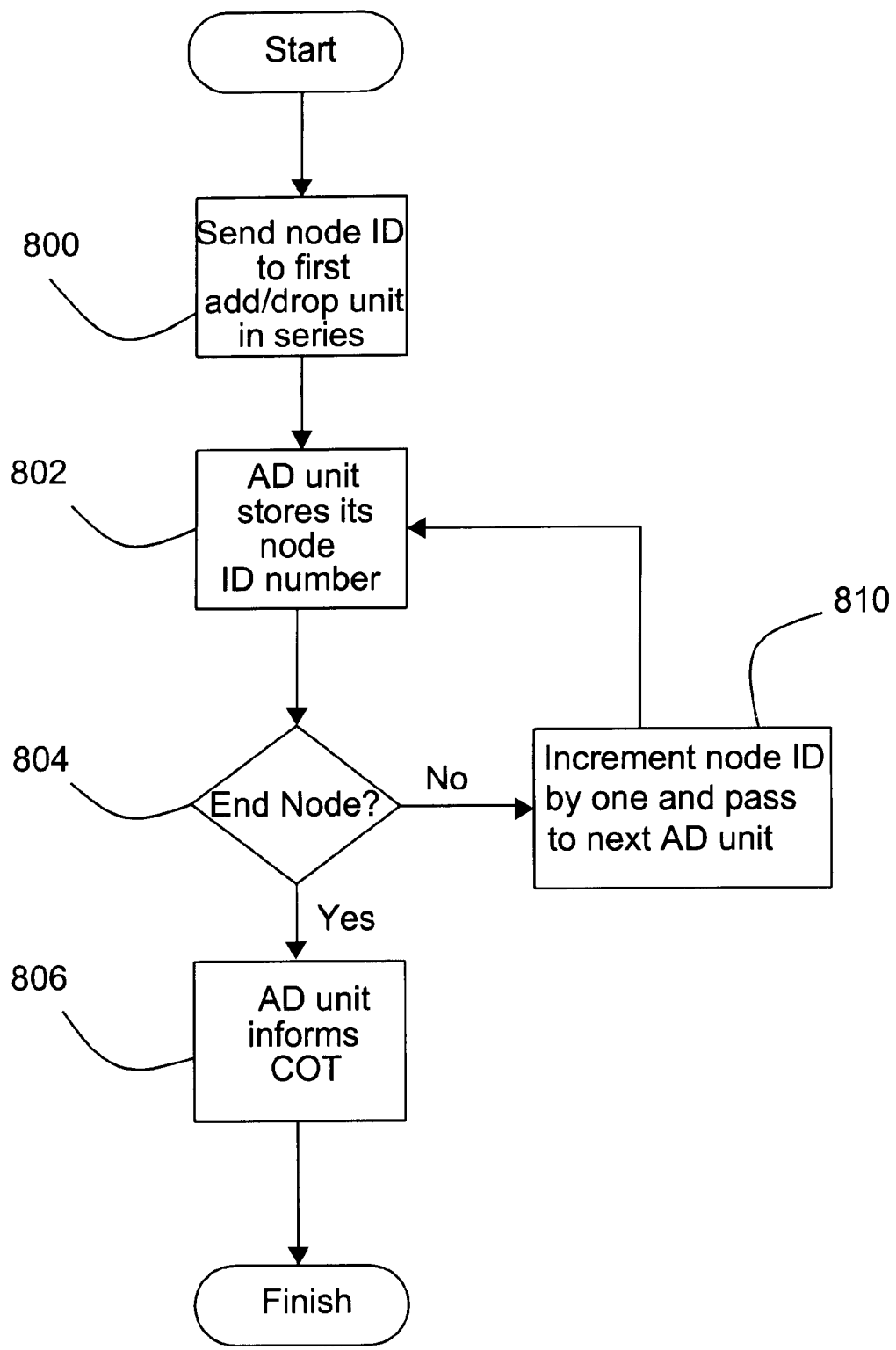
FIG. 8 is a flow chart showing how node IDs are assigned according to the preferred embodiment of the invention.

When the MDDL 100 is initialized, the COT 102 assigns each AD Unit 106 the appropriate node ID according to its position in the series according to the flow chart of FIG. 8. At step 800, the COT 102 transmits a node ID of "0" to the first AD Unit in the series. That AD Unit then accepts the node ID at step 802. The AD Unit then determines whether it is an end unit by sensing whether there is a connection at the downstream bit pump at step 804. If it is an end unit (i.e. there is no downstream connection), then the AD Unit sends a message over the appropriate EOC (according to its node ID) informing the COT 102 that it is an end unit at step 806. If the AD Unit is not an end unit, then it increments the node ID by one and relays it to the next AD Unit in the series at step 810. This procedure continues until all AD Units have been assigned node IDs.

There are two types of messages: command messages and status messages. Command messages are requests sent from the COT 102 to an AD Unit 106 that requires the AD Unit to act and respond. Status messages are autonomous reports sent from an AD Unit 106 to the COT 102. The format of a command message is as follows:

Bit 15: 0
Bit 14-8: Message type
Bit 7-0: Message data

The format of a status message is as follows:

Bit 15: 1
Bit 14-0: Status bits

Bit 15 indicates whether the message is a command message (from COT to AD) or a status message (from AD to COT). An exception is when the AD Units 106 are in automatic assignment mode, as described below.

As shown in the table 900 of FIG. 9, one purpose of a status message sent from an AD Unit 106 to the COT 102 is to request a subscriber channel number assignment. The AD Unit ordinarily requests a subscriber channel number assignment in response to a craftsperson adjusting one or both of the selector switches 306 and 308 (from FIG. 3). In the preferred embodiment, the selector switch settings map to the subscriber channel numbers according to the table 1000 in FIG. 10. For example, if a customer had an AD Unit 106 attached to the outside of his home, and only had line 1 activated, a craftsperson (telephone technician) could set up a second line by physically going to the AD Unit 106 and setting the selector 308 of AD unit 106 (corresponding to line 2). The craftsperson would already know which subscriber channel number to request for this line based on instructions from the phone company. To request subscriber channel number 9, the craftsperson would set the selector switch to "9". The AD Unit 106 then sends a status message of 1101 0001 0000 0000. Note that bit 12 simply indicates that AD Unit 106 is still functioning, and that bit 14 is an "alternate status indicator," informing the COT 102 that the AD Unit 106 is requesting subscriber channels. Also note that this AD Unit 106 is not an end unit (bit 13 is low).

The COT 102 is also capable of sending five-bit broadcast messages to all of the AD Units 106 as shown in FIG. 7. The least significant bit of the broadcast message is a "node alarm" indicator. A value of "1" on this bit indicates one or more nodes are in an alarm condition. The remaining bits indicate the subscriber channel in conflict, if any. When an AD Unit receives a broadcast message from the COT 102, it processes the message and then relays it to the next AD Unit in the series. One of the functions of the broadcast message is to inform the AD Units 106 of any "node alarm" conditions. One such condition is subscriber channel conflict, wherein one or more AD Units is requesting the assignment of a subscriber channel number that is already in use by another AD Unit. The translation of the most significant four bits of the broadcast messages in the context of signaling a subscriber channel conflict is shown in the table 1100 of FIG. 11.

Figure 12A:
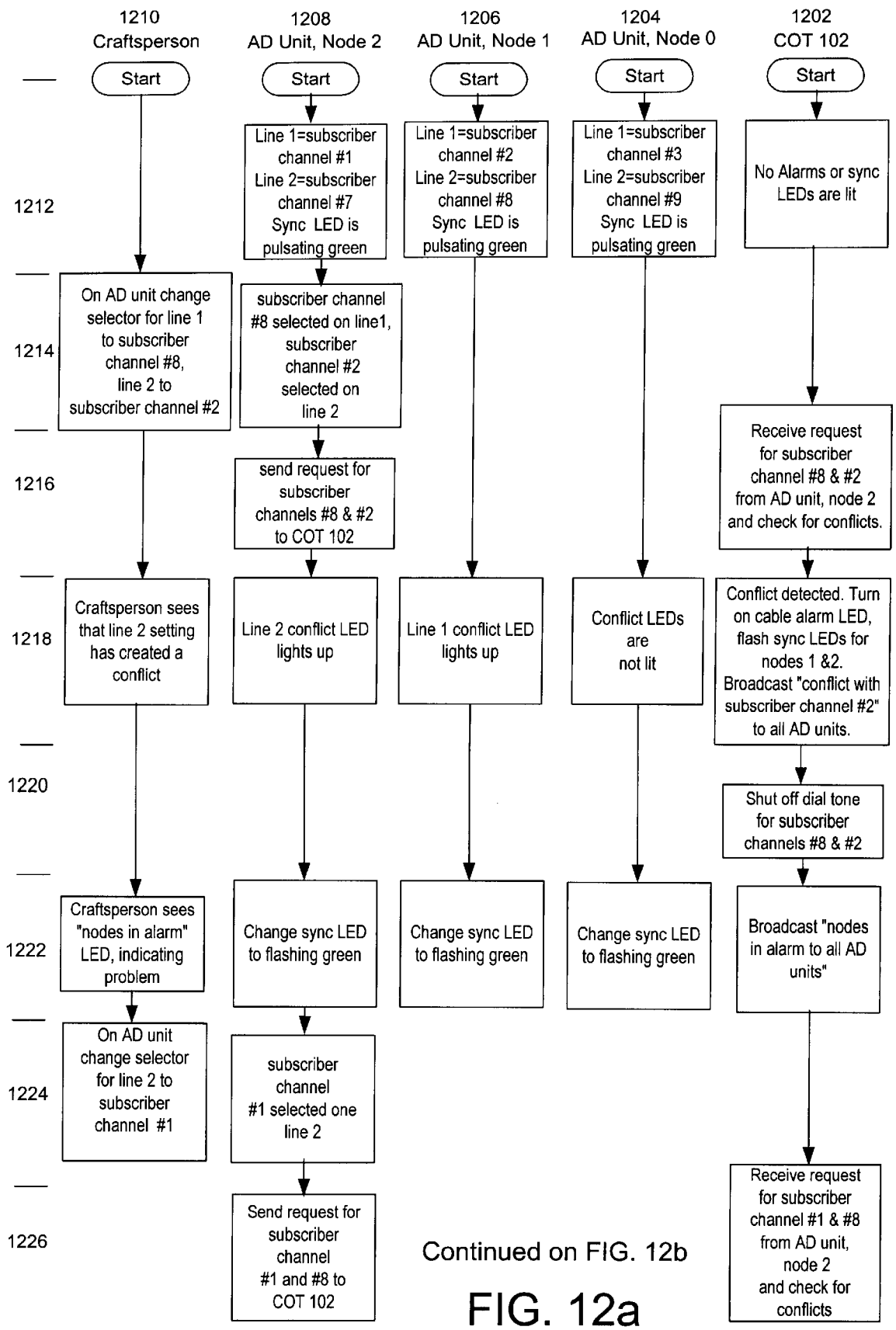
FIGS. 12a and 12b are a set of flowcharts showing how the preferred embodiment of the invention handles subscriber channel conflicts.
Figure 12B:
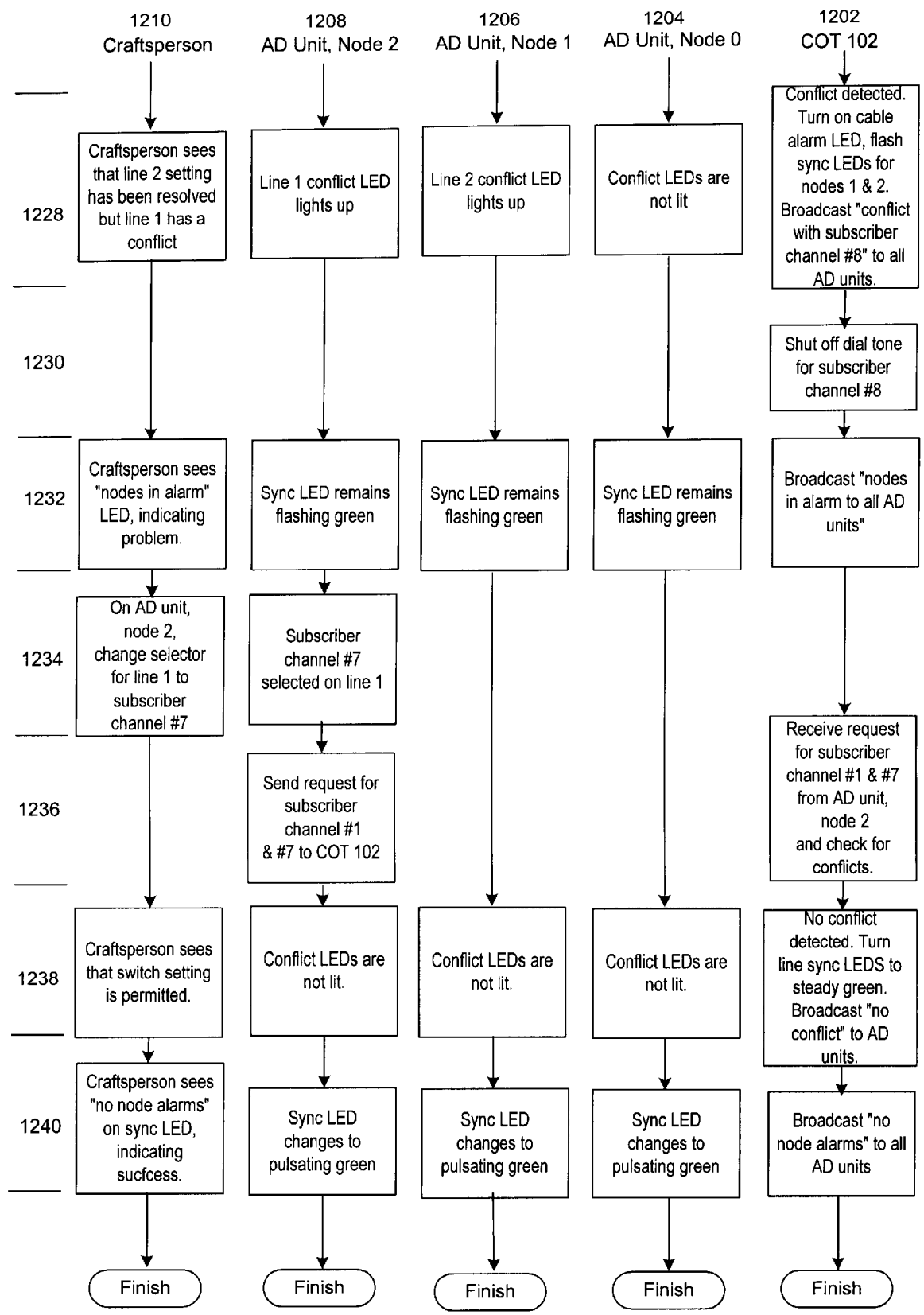

To illustrate how the MDDL 100 apportions subscriber channel numbers and resolves subscriber channel conflicts, reference is made to the flowcharts of FIGS. 12a and 12b. The flowcharts 1202–1208 depict the steps performed by the COT 102 and the AD Units 106 at nodes 0–2 respectively. The flowchart 1210 depicts the actions performed by a craftsperson who is at the AD Unit of node 2, attempting to change the subscriber channel assignment of that particular AD Unit. The flowcharts of these figures correspond to an exemplary MDDL 100 configured as in FIG. 1, with three AD units 106. Although this example describes the various LEDs as having certain colors and lighting schemes (for example, "flashing green"), it is contemplated that other colors and lighting schemes may be used.

At step 1212, the MDDL 100 is functioning normally, and all elements are synchronized. At step 1214, the craftsperson changes the selectors on the node 2 AD Unit to "8" and "2," corresponding to subscriber channels #8 and #2. At step 1216, the AD Unit at node 2 sends a request to the COT 102 in the form of a status message 1111 0000 1000 0010 on EOC 2. Note that since this AD Unit is an end unit, bit 13 is high. The COT 102 receives this request and checks for conflicts. Since both of these subscriber channel numbers are already in use by the AD Unit at node 1, the COT 102 determines that there is a conflict on subscriber channels #2 and #8. It starts with the lowest subscriber channel first and broadcasts 00011, signaling the AD Units that subscriber channel #2 is in conflict. Note that the least significant bit (node alarm bit) is high, indicating a conflict, while the most significant four bits indicate the channel in conflict as shown in table 1100 in FIG. 11. The COT 102 also causes the sync LEDs 502 for nodes 1 and 2 to flash green on the front panel 500.

In response to the broadcast, all conflict LEDs on the AD Units corresponding to the subscriber channels in conflict light up red. In this case, the line 1 conflict LED 310 of the AD Unit at node 2, and the line 2 conflict LED 312 of the AD Unit at node 1 light up. The craftsperson at the AD Unit of node 2 sees the red light for line 2 and realizes that there is a conflict. At step 1222, the COT 102 broadcasts a "nodes in alarm " signal to all of the AD Units using the node alarm bit. This causes all of the AD Units put their respective sync LEDs 314 into a flashing green mode. Thus, even the AD units not directly affected by the subscriber channel conflict will indicate that there is a problem somewhere in the loop. At step 1224, the craftsperson corrects the problem by turning the selector 308 of the node 2 AD Unit to "1," thereby causing the AD Unit at node 2 to initiate a request for subscriber channels #8 and #1 by sending a status message of 1111 0000 1000 0001 on EOC 2. However, there is still a conflict. Once the COT 102 processes the new request, it detects the conflict on subscriber channel #8 and broadcasts the binary value 01111 at steps 1226 and 1228. The craftsperson now sees a red conflict LED for line 1, and responds by changing the selector 306 of the AD Unit at node 2 to "7," thereby causing the AD Unit at node 2 to initiate a request for subscriber channels #7 and #1 by sending a status message of 1111 0000 0100 0001 on EOC 2 at step 1236. This time the COT 102 detects no conflicts, changes its line sync LEDs 502 to a steady green, and broadcasts a "no nodes in conflict" signal to the AD Units by dropping the node alarm bit to 0. In response, the conflict LEDs of all AD Units turn dark, and all of the sync LEDs 314 turn to an intermittently pulsating green, indicating that the loop is functioning properly.

Figure 13:
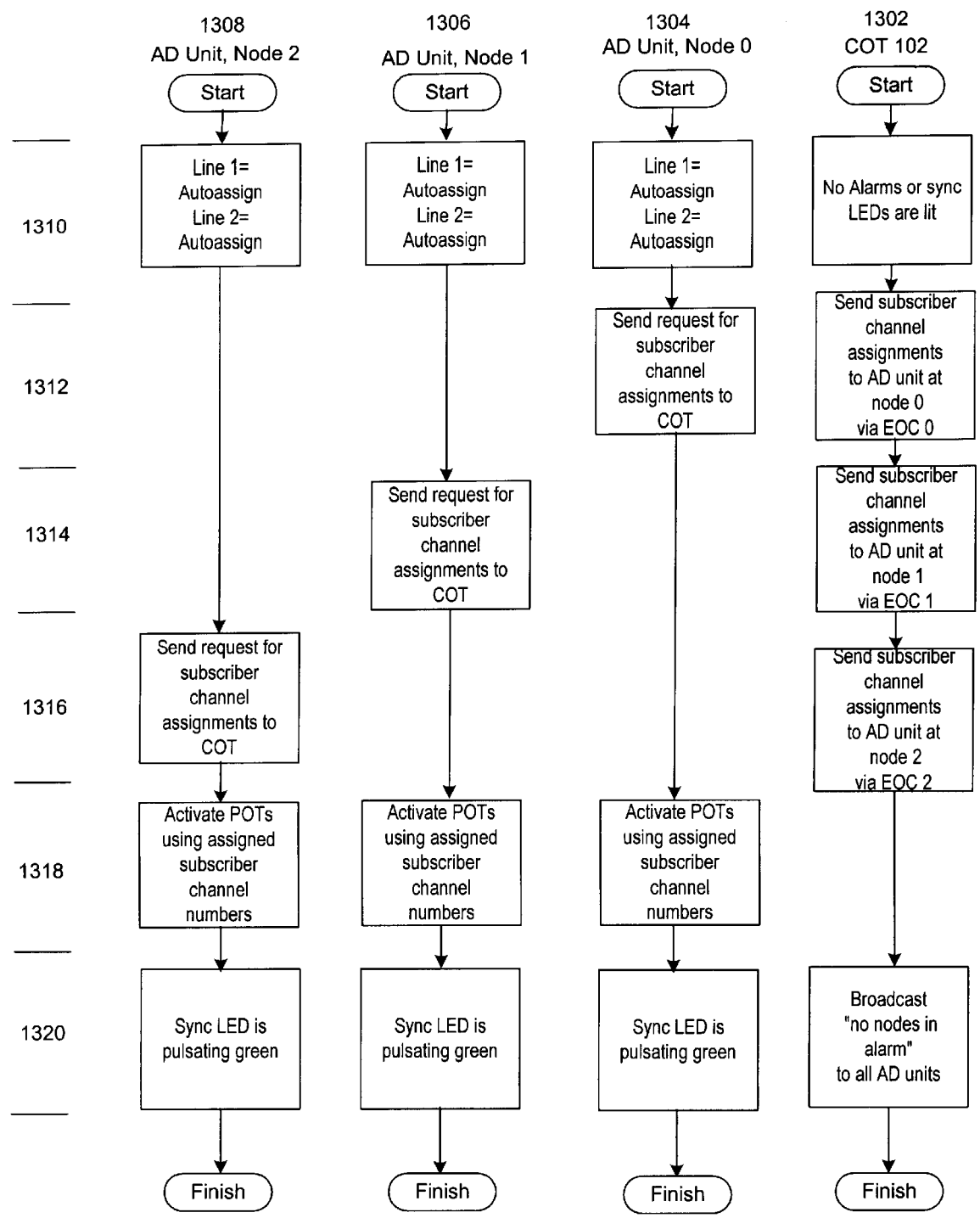
FIG. 13 is a set of flowcharts showing how the preferred embodiment of the invention performs an auto-assignment of subscriber channels.

In the preferred embodiment, the MDDL 100 of FIG. 1 can also function in an "auto-assign" mode, whereby the COT 102 automatically assigns subscriber channel numbers to the AD Units 106. With reference to FIG. 13, the flowcharts 1302–1308 depict the steps performed by the COT 102 and the AD Units 106 at nodes 0–2 respectively. In this example, all of the selectors 306 and 308 of the AD Units 106 have been preset to "F," which, as shown in table 1000 of FIG. 10, places the AD Units in under the control of the COT 102 for the purpose of assigning subscriber channel numbers. When the MDDL 100 powers up in this mode, it first initializes and assigns node IDs according to the procedure of FIG. 8. Then, each AD Unit 106 sends a status message having the least significant twelve bits set low to the COT 102 at steps 1312–1314. In the previous examples, the status message was used by the AD Units to request subscriber channel assignments. However, since bits 11-0 are all set low, the COT 102 is informed that the AD units are in automatic assignment mode. In response, the COT 102 reads a look-up table or similar data structure from COT RAM 610 to determine the correct subscriber channel assignments for the AD Units, and then transmits a message to each of the requesting AD Units over EOCs 0-2 to inform each AD Unit of its respective subscriber channel assignments at steps 1312-1316. The message is formatted as a status message, which, in a normal mode, is only used for communication from the AD Units to the COT 102. However, the AD Units are programmed to recognize that any message originating from upstream is coming from the COT 102. Bit 15 of the message is 1, while bits 11-0 will be set according to the subscriber channel assignments. For example, if the AD Unit at node 1 is supposed to receive the subscriber channel assignments of #4 and #8, then the message sent over EOC 1 will be 1100 0000 1000 1000. At step 1318, the AD units activate their respective POT's using the assigned subscriber channels. Although the scenario shown in FIG. 13 shows all of the AD Units 106 set in the auto-assign mode, some AD Units 106 may be set in the standard mode while others are set in the auto-assign mode.

Figure 14:
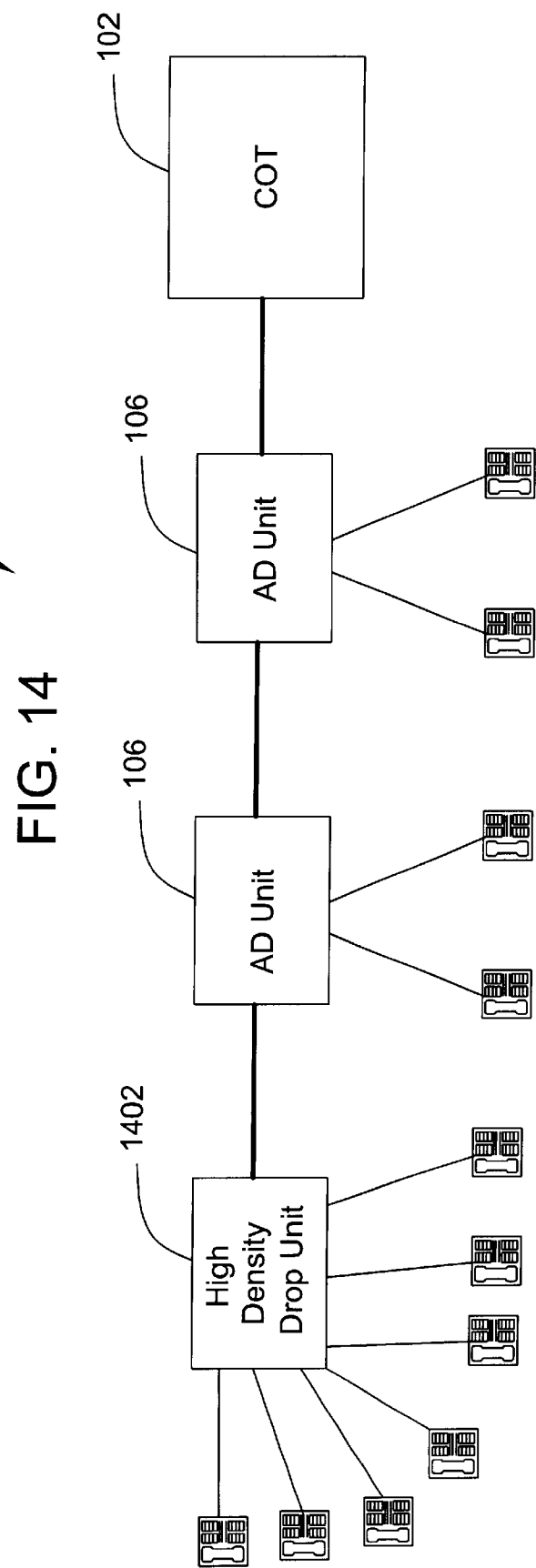
FIG. 14 is a block diagram of an alternative embodiment of the invention.

An alternative embodiment of the invention is shown in FIG. 14. The end unit of the MDDL 100 can also be a high density drop unit 1402. The internal architecture of the high density drop unit 1402 is similar to that of the AD Unit 106 shown in FIG. 4, except that the high density drop unit 1402 does not have a downstream bit pump 404, and has twelve drop side connectors 302 for accommodating up to 12 POTs. In the preferred embodiment, the controller 412 of the high density drop unit 1402 may be a microprocessor, such as a Dallas DS87c520 microprocessor with 16K of ROM and 256 bytes of RAM internally, and 2 UARTs. Other microprocessors may be used, however. The high density drop unit 1402 has a conflict LED and a sync LED. The conflict LED lights up when any of the subscriber channels requested by the high density drop unit 1402 is in conflict.

Figure 15:
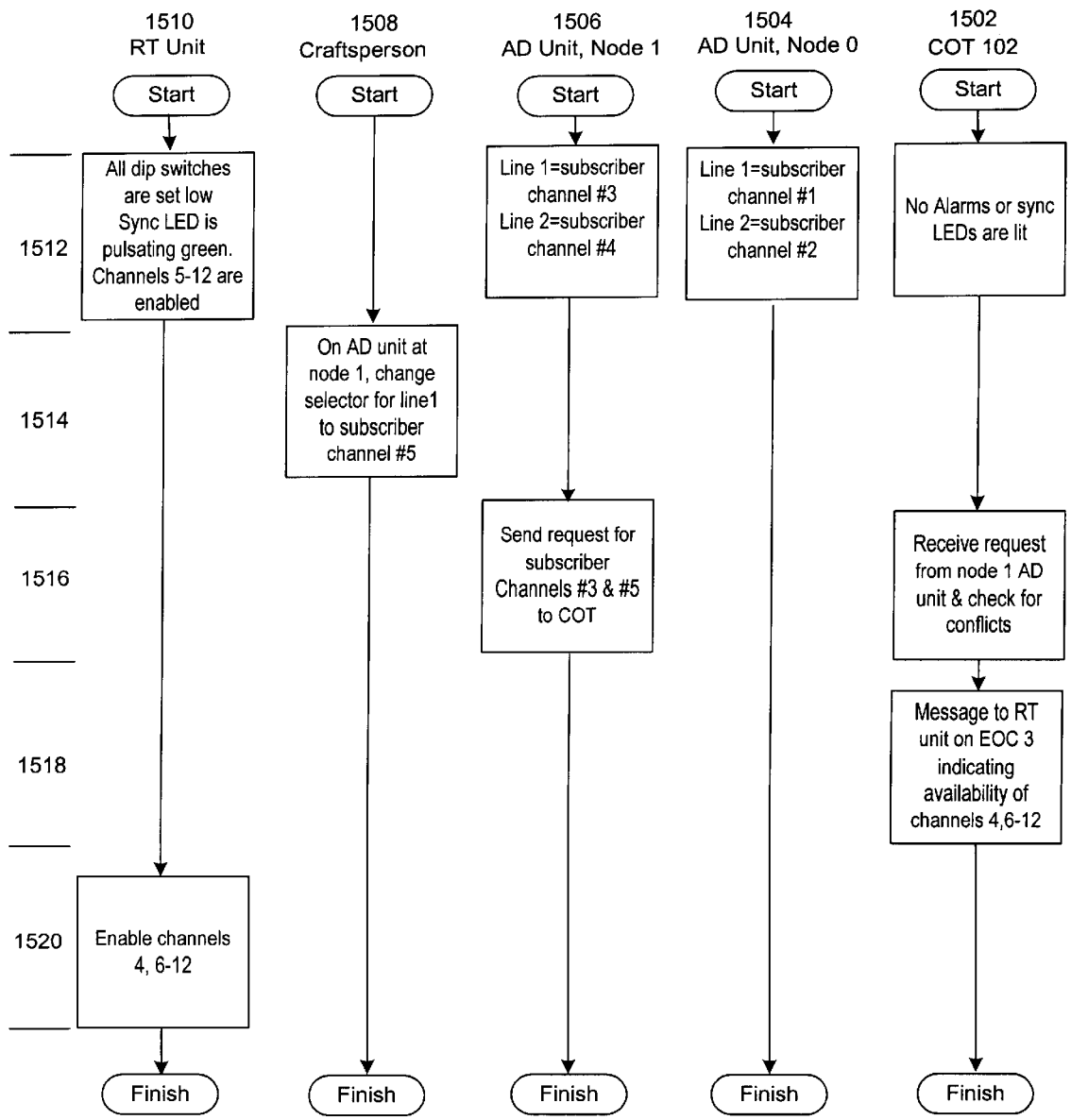
FIG. 15 is a set of flowcharts showing how the alternative embodiment functions in the low priority mode.

In the alternative embodiment, the high density drop unit 1402 has a bank of dip switches that cause it to request subscriber channels in a manner identical to that of the AD Unit 106, as described above, which is referred to as the "fixed mode." The high density drop unit 1402 can operate in a "low priority mode," as shown by way of example in FIG. 15. The flowcharts 1502–1510 depict the steps performed by the COT 102, the AD Units 106 at nodes 0–1, by a craftsperson at the AD Unit of node 1, and by the high density drop unit 1402. At step 1512, the dip switches of the high density drop unit start in low position, indicating to the COT 102 that the high density drop unit is in a low priority mode. At step 1514, the craftsperson changes the line 1 selector of the AD Unit at node 1 to a "5," thereby causing it to initiate a request for subscriber channels #3 and #5 to the COT 102. The COT 102 responds by checking for conflicts. Having found none, the COT 102 sends a message to the high density drop unit 1402 over EOC 2 at step 1516 in the same format as the auto-assign messages described above for the AD Units. In this example, the message would be 1101 1111 1110 1000, indicating that subscriber channels 4 and 6–12 have been assigned to the high density drop unit 1402. The high density drop unit then responds at step 1518 by enabling the assigned channels.

Figure 16:
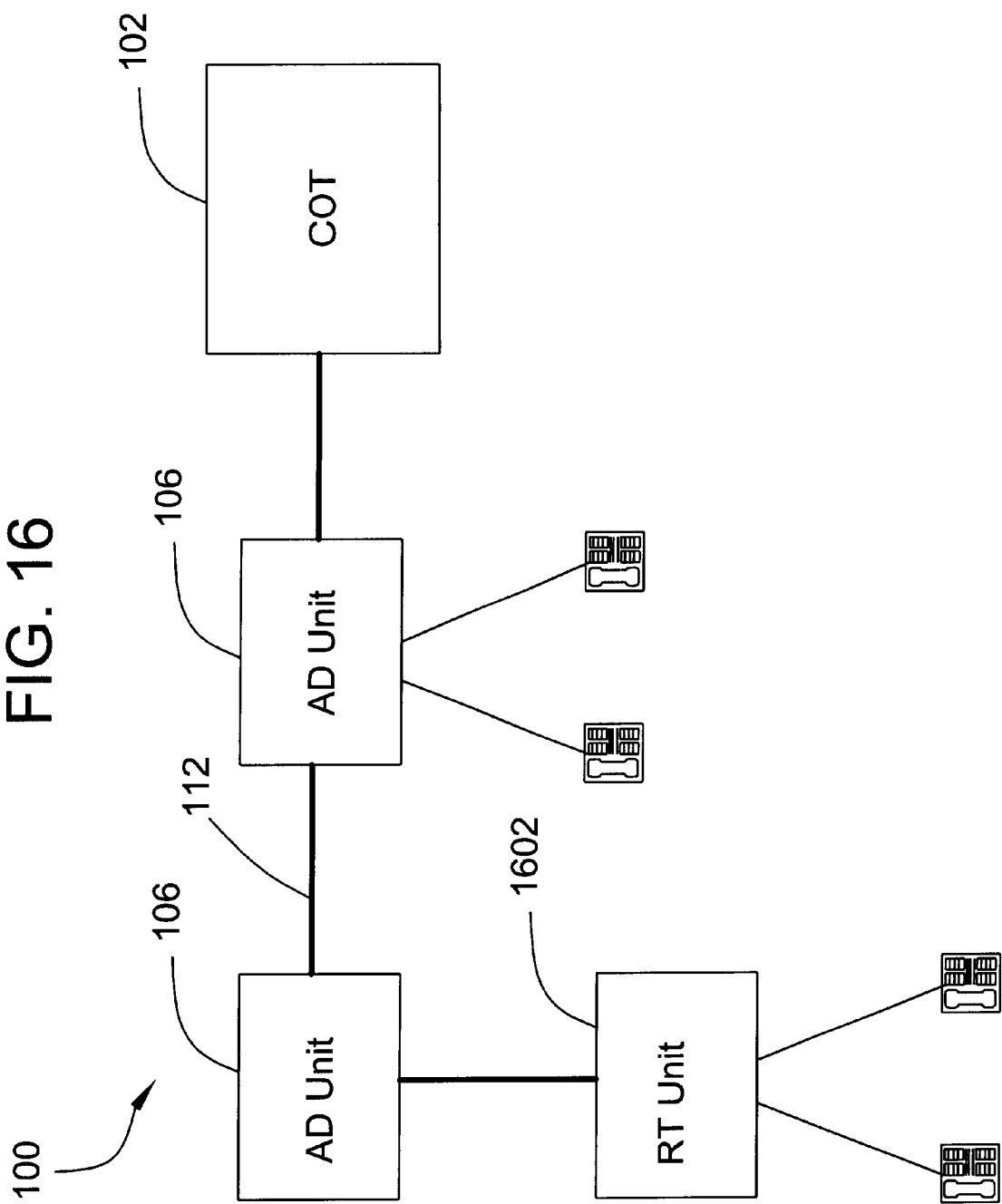
FIG. 16 is a block diagram showing the overall layout of a second alternative embodiment of the invention.

In a second alternative embodiment, the MDDL 100 may be configured as shown in FIG. 16. An AD Unit 106 may drop a conventional remote terminal (RT) 1602 to a subscriber's residence or business in lieu of dropping one or more POTs lines. In this embodiment, up to two POTs lines may be attached to the RT 1602 to provide telephone service to the subscriber. The advantage of this embodiment is that is requires less twisted pair wiring, since only one bunch of wire needs to be strung from the telephone pole to the subscriber's residence or business as opposed to two bunches when the POT lines run directly from the AD Unit 106.

In view of the many possible embodiments to which the principals of this invention may be applied, it should be recognized that the embodiment described herein with respect to the drawing figures is meant to be illustrative only and should not be taken as limiting the scope of the invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A multi-drop, multi-channel phone link for a telephone system comprising:

a set of remote terminals, each remote terminal including a first processing unit associated with a first memory, the first memory containing instructions executable by the cu first processing unit to issue a request for a channel;

a central office terminal having a second processing unit associated with a second memory, the second memory containing instructions executable by the second processing unit to determine the availability of a channel based upon the request from a remote terminal from the set of remote terminals and to issue a message indicating a request conflict in the event that the channel is unavailable for assignment to the remote terminal; and a communication path communicatively linking the central office terminal to the set of remote terminals.

2. The multi-drop phone link of claim 1, wherein the remote terminals include a converter that receives analog signals via the communication path and converts the analog signals to digital data streams, and further includes a gate array that extracts data from the digital data streams and transmits the digital data streams to the first processing unit.

3. The multi-drop phone link of claim 1, wherein the remote terminals further comprise a conflict indicator responsive to the request conflict message signal transmitted by the central office terminal to the remote terminals.

4. The multi-drop phone link of claim 1, wherein the message indicating a request conflict is a broadcast signal receivable by at least a second remote terminal communicatively connected to the central office terminal via the communication path.

5. The multi-drop phone link of claim 1, wherein the second memory further contains instructions executable by the second processing unit to issue a message indicating a successful channel assignment in the event that the channel was assigned to the requesting remote terminal in response to the request.

6. The multi-drop phone link of claim 5, wherein the message indicating a successful channel assignment is a broadcast signal receivable by at least a second remote terminal communicatively connected to the central office terminal via the communication path.

7. A multi-drop phone link comprising:
   a remote terminal having a first controller associated with a first memory, the first memory containing instructions executable by the first controller to transmit a status message comprising a request for a channel;
   a central office terminal having a second controller associated with a second memory, the second memory containing instructions executable by the second controller to transmit a command message indicating whether or not the request can be fulfilled; and
   a telephone link communicatively coupling the remote terminal and the central office terminal to facilitate transmitting the status message and the command message between the central office terminal and the remote terminal wherein the second memory contains instructions executable by the second controller to facilitate broadcasting a subscriber channel conflict message.

8. The multi-drop phone link of claim 7 wherein the second memory contains instructions executable by the second controller to generate a node number for the remote terminal, and wherein the node number, once assigned is used to associate a channel to the remote terminal.

9. The multi-drop phone link of claim 7, wherein the command message is a channel assignment message for the remote terminal.

10. The multi-drop phone link of claim 7, wherein the second memory contains:
    a data structure associating the remote terminal to a channel, and
    instructions executable by the second controller to facilitate transmitting a subscriber signal to the remote terminal over the subscriber channel according to the association.

11. In a telephone service delivery system having a central office terminal and a set of remote terminals linked to the central office terminal via a communication network, a method of assigning identifications to individual ones of the set of remote terminals comprising the steps of:

generating, by the central office terminal, a node identification and transmitting the node identification to a first remote terminal;

receiving, by the first remote terminal, the node identification and in response storing the node number in a data structure associating the node number with the remote terminal, detecting, by the first remote terminal, the presence of a second remote terminal in the set of remote terminals, and in response transmitting a distinct node identification to the second remote terminal;

determining, by a last remote terminal, that each one of the set of remote terminals has been assigned an identification and in response sending a signal to the central office terminal indicating that the last remote terminal is an end unit;

wherein the node identifications associate, during normal operation of the telephone service delivery system, a message to a particular remote terminal in the telephone delivery system.

12. The method according to claim 11, further comprising the steps of:
    sending, by a requesting remote terminal, a request for a channel assignment to the central office terminal; and
    assigning, by the central office terminal in response to receiving the request for a channel, a channel to the requesting remote terminal and transmitting a channel assignment message including a channel identification to the requesting remote terminal; and
    receiving, by the requesting remote terminal, the channel assignment and thereafter directing messages bearing the channel identification to a connector on the requesting remote terminal, the connector being adapted to connect to a telephone device.

13. In a telephone service delivery system having a central office terminal and a set of remote terminals linked to the central office terminal via a communication network, a method for assigning a unique channel identification to a requesting remote terminal comprising the steps of:
    sending, by the requesting remote terminal via the communication network, a request to the central office terminal for a desired channel;
    determining, by the central office terminal in response to receiving the request, the availability of the desired channel for assignment to the requesting remote terminal, and if the desired channel is available, then assigning the desired channel to the requesting remote terminal;
    receiving, by the requesting remote terminal via the communication network, notification of the assigning of the desired channel to the requesting remote channel, and thereafter directing signals received within the desired channel to a connector on the requesting remote terminal, the connector being adapted to connect to a telephone device, and visually indicating, by the requesting remote terminal that the desired channel has been assigned to the requesting remote terminal.

14. The method of claim 13, further comprising the step of visually indicating, by the central office terminal, that it has not detected that the desired channel has previously been assigned to another remote terminal.

15. In a telephone service delivery system having a central office terminal and a set of remote terminals linked to the central office terminal via a communication network, a method of preventing a channel conflict comprising the steps of:

sending, by the requesting remote terminal via the communication network, a request to the central office terminal for a desired channel;

determining, by the central office terminal in response to receiving the request, the availability of the desired channel for assignment to the requesting remote terminal, and if the desired channel has been assigned, then issuing a request denial message to the requesting remote terminal; and visually indicating, by the requesting remote terminal, that the desired channel is not available.

16. The method of claim 15, further comprising the step of visually indicating, by the central office terminal, that a desired channel could not be assigned to the requesting remote terminal.

17. A central office terminal for use in a telephone communication system, the communication system capable of supporting a set of remotely connected termination units that communicate with the central office terminal via assigned channels, the central office terminal comprising:

a processing unit;

a modifiable memory defining assignment status for a set of channels for communicating with remotely connected termination units;

a set of instructions executable by the processor to perform steps comprising: receiving requests from each of the remotely connected termination units, assigning a channel to at least one of the remotely connected termination units, and determining whether there is a conflict related to the channel assignment; and an electronic signal transmission interface coupled to the processor unit facilitating notifying the remotely connected termination unit of the channel assignment and of any conflicts.

18. The central office terminal of claim 17 further comprising excutable instructions for referencing the configurable memory and determining whether a requested channel is presently assigned to another remotely connected termination unit.

19. A remote termination device for use in telephone communication system, the communication system capable of supporting a set of remotely connected termination devices that communicate with a central office terminal via assigned channels, the remote termination device comprising:

a possessing unit;

a modifiable memory defining channel assignment status for communication between the remote termination device and the central office on a link supporting multiple channels;

a set of instruction executable by the processor to set a channel on which the remote termination device communicates with the central office terminal;

an electronic signal transmission interface coupled to the processor unit facilitating requesting assignment of one of the set of channels from the central office terminal and a visual indicator coupled to the processing unit and indicating to a user whether a requested channel assignment has been acknowledged by the central office terminal.

* * * * *